United States Patent
Pantzar et al.

(10) Patent No.: US 7,407,351 B2
(45) Date of Patent: Aug. 5, 2008

(54) ROTATABLE TOOL COMPRISING A SHANK, A DRAWBAR AND A CUTTING HEAD

(75) Inventors: Göran Pantzar, Arsunda (SE); Isak Kakai, Gävle (SE)

(73) Assignee: Sandvik Intellectual Property AB, Sandviken (SE)

( * ) Notice: Subject to any disclaimer, the term of this patent is extended or adjusted under 35 U.S.C. 154(b) by 400 days.

(21) Appl. No.: 11/201,145

(22) Filed: Aug. 11, 2005

(65) Prior Publication Data

US 2006/0051174 A1    Mar. 9, 2006

(30) Foreign Application Priority Data

Aug. 19, 2004    (SE) .................................... 0402039

(51) Int. Cl.
*B23B 31/11*    (2006.01)

(52) U.S. Cl. .............................. 409/234; 279/8; 407/53; 408/233; 411/405

(58) Field of Classification Search ......... 408/231–233, 408/238–239 A, 226; 279/8; 409/232, 234; 407/53, 54; 411/405
See application file for complete search history.

(56) References Cited

U.S. PATENT DOCUMENTS

| | | | | | |
|---|---|---|---|---|---|
| 2,529,396 | A | * | 11/1950 | Hunt | 279/52 |
| 3,153,356 | A | * | 10/1964 | Dearborn | 408/59 |
| 4,334,811 | A | * | 6/1982 | Trumpf et al. | 409/233 |
| 4,580,472 | A | * | 4/1986 | Kastner | 82/161 |
| 4,632,614 | A | * | 12/1986 | Rall et al. | 409/233 |
| 4,850,759 | A | * | 7/1989 | Strand et al. | 408/239 A |
| 6,302,888 | B1 | * | 10/2001 | Mellinger et al. | 606/73 |
| 2003/0210963 | A1 | | 11/2003 | Kakai et al. | |
| 2004/0223817 | A1 | | 11/2004 | Berglow et al. | |

FOREIGN PATENT DOCUMENTS

| | | |
|---|---|---|
| EP | 0638384 B1 | 1/1997 |
| EP | 776719 A1 * | 6/1997 |
| EP | 949030 A1 * | 10/1999 |
| SE | 0300313 | 7/2004 |
| WO | WO 02076661 A1 * | 10/2002 |
| WO | 03/090959 A1 | 11/2003 |

\* cited by examiner

*Primary Examiner*—Daniel W Howell
(74) *Attorney, Agent, or Firm*—Drinker Biddle & Reath LLP

(57) ABSTRACT

A rotatable tool includes a shank rotatable about a longitudinal axis, a drawbar mounted to an axial front end of the shank, and a cutting head mounted to an axial front end of the drawbar. The shank and the drawbar include mutually engageable screw threads which impart an axial displacement of the drawbar relative to the shank. The cutting head and the drawbar include mutually engageable serrations for transferring axial force therebetween. The serrations are axially spaced from one another and extend transversely relative to the axis.

16 Claims, 6 Drawing Sheets

Fig. 1
Fig. 2
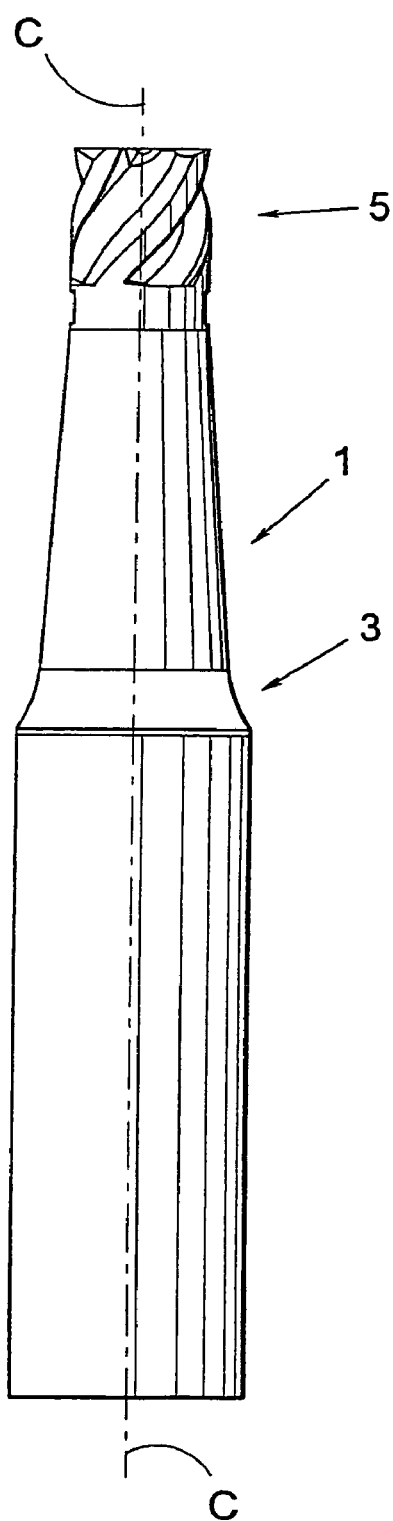
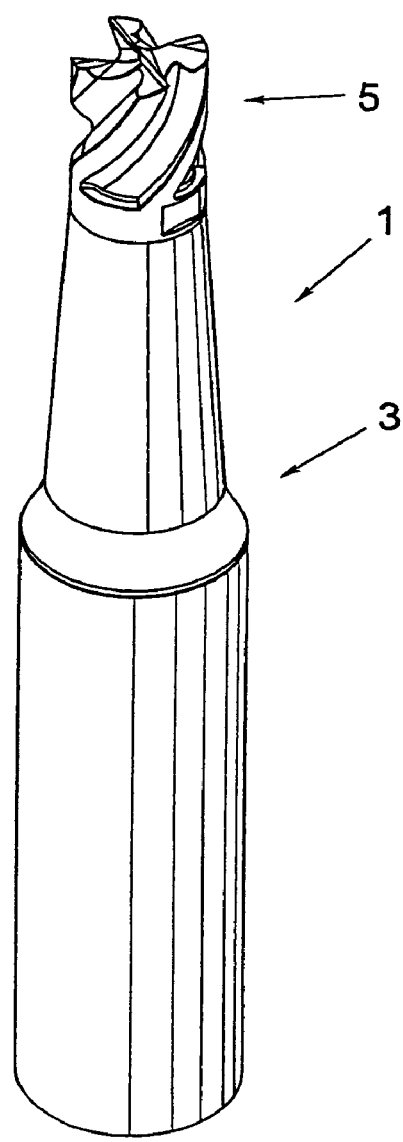

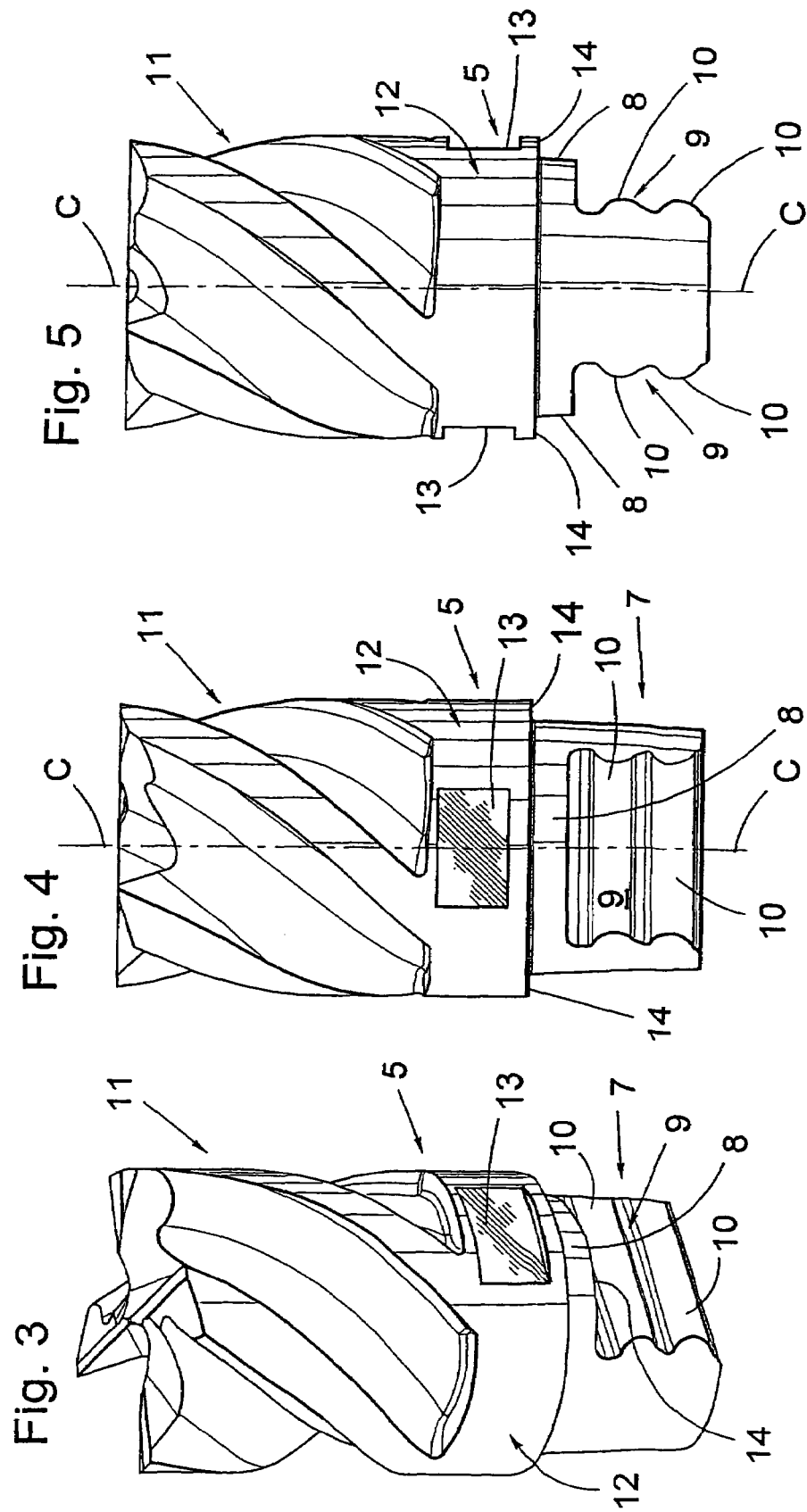

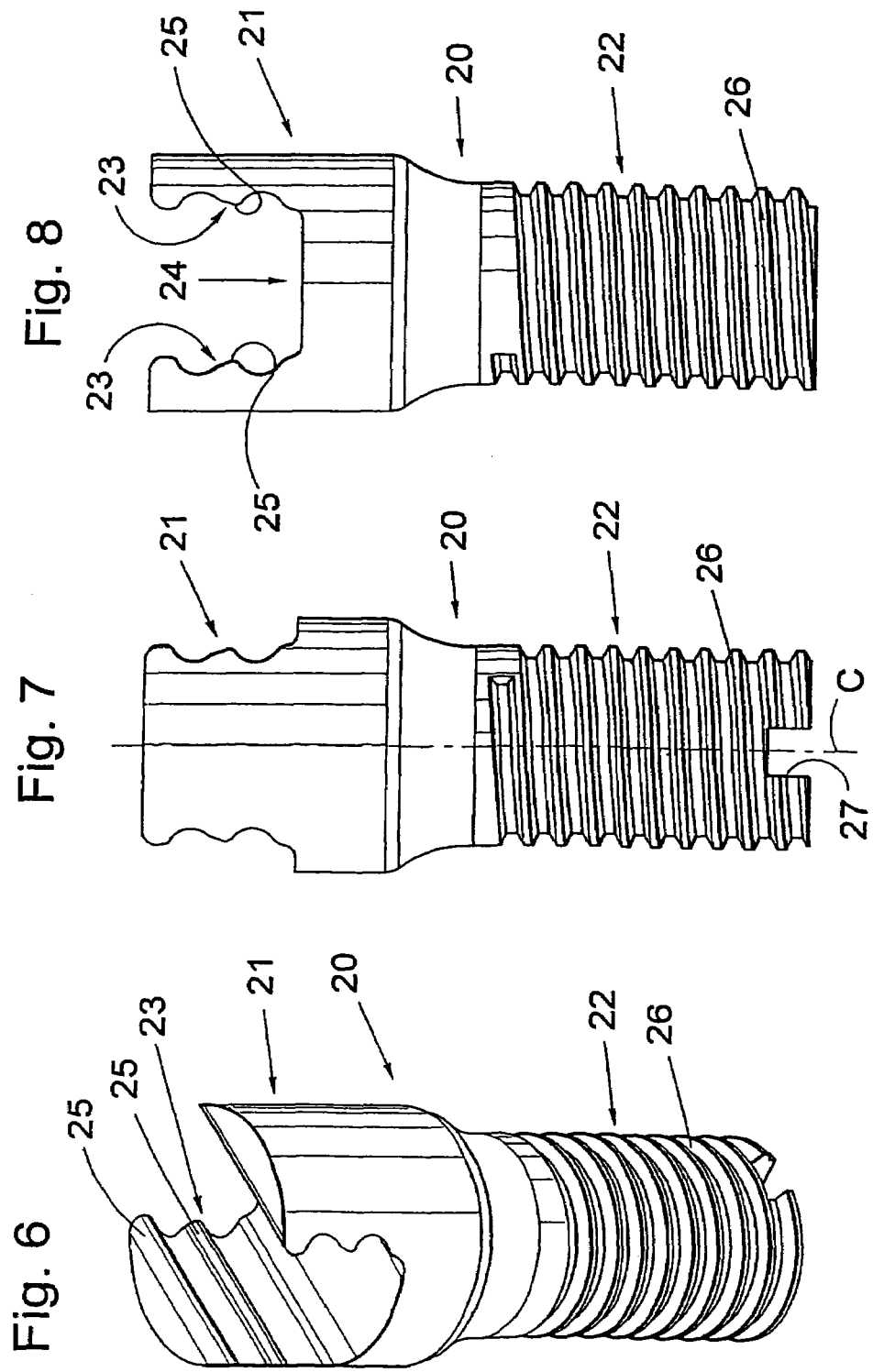

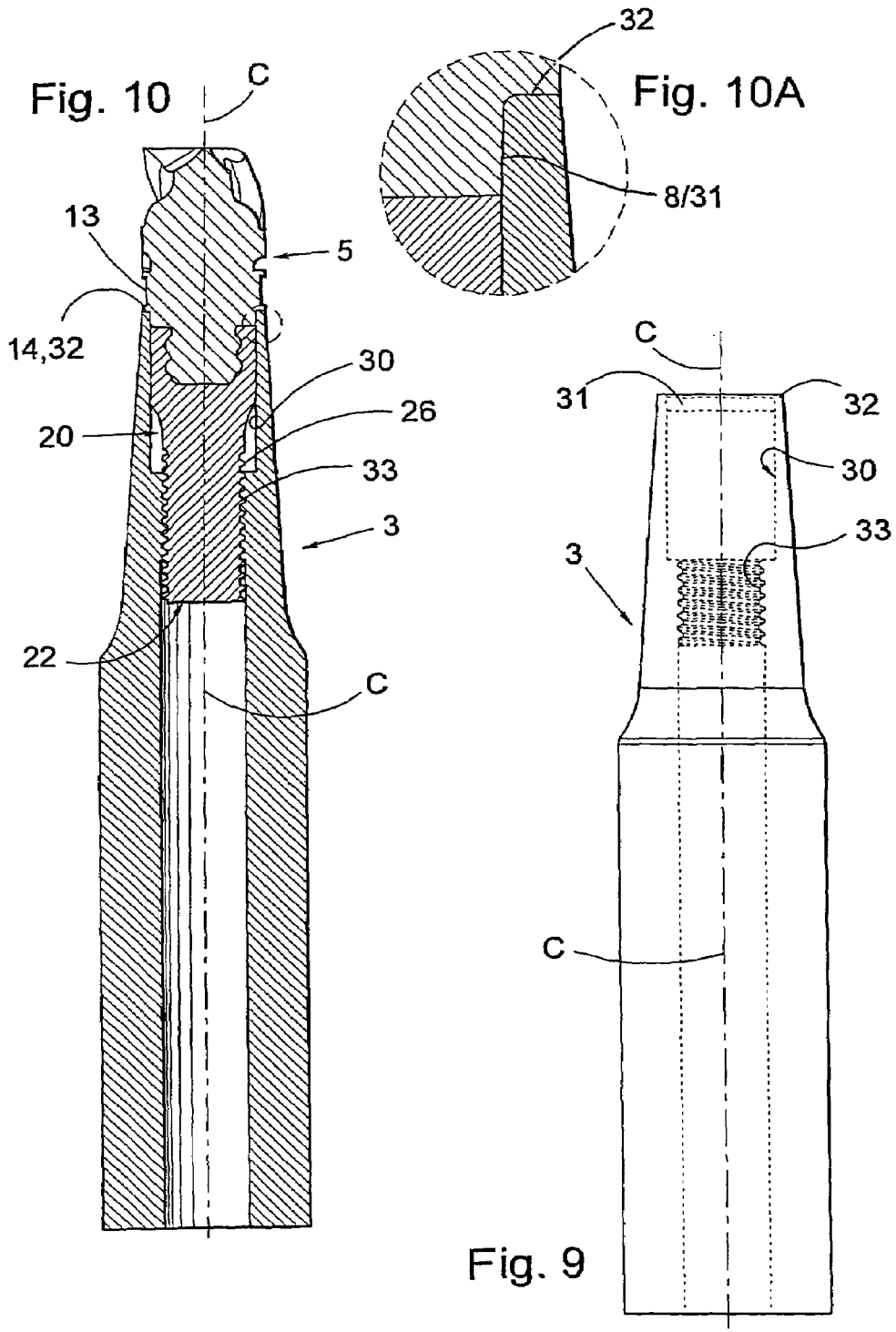

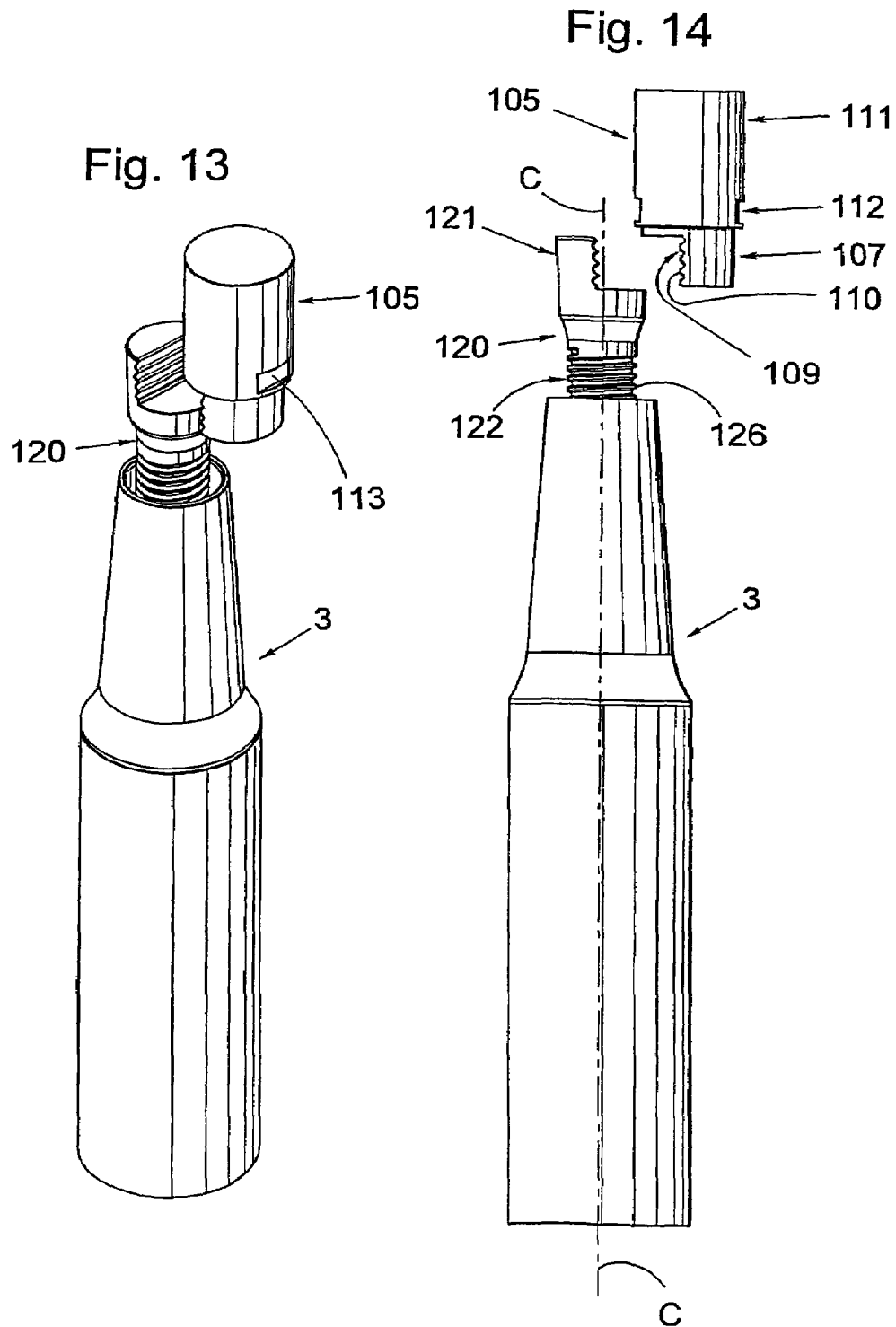

ROTATABLE TOOL COMPRISING A SHANK, A DRAWBAR AND A CUTTING HEAD

The present application claims priority under 35 U.S.C. § 119 to Patent Application Serial No. 0402039-2 filed in Sweden on Aug. 19, 2004.

TECHNICAL FIELD OF THE INVENTION

The present invention relates to a rotatable tool, which comprises a shank, a cutting head and a drawbar, the shank and the drawbar having cooperating members for imparting to the drawbar and the shank a displacement in relation to each other in the axial direction of the tool, and that the cutting head and the drawbar have cooperating engagement members for the transfer of forces in the axial direction of the tool. The invention also separately relates to a cutting head and a drawbar.

STATE OF THE ART

By EP 0 776 719, a rotary tool for cutting machining is previously known, the tool comprising an exchangeable cutting head, a shank as well as a connecting piece. Transfer of force in the axial direction between the cutting head and the connecting piece takes place by a pin of the cutting head cooperating with a groove of the connecting piece. The connecting piece also has an external thread, which is in engagement with an internal thread of the shank. The shank has a generally cone-shaped seat, which is intended to co-operate with conical parts of the cutting head and the connecting piece. Upon rotation of the connecting piece in relation to the shank, an axial displacement of the connecting piece in relation to the shank will take place, and via the pin/groove coupling, the cutting head is pulled into the seat of the shank.

By SE-A-0200852-2 (U.S. Publication 2003/0210963), a rotary tool is previously known where a connecting piece has a recess defined by axially slotted walls. A male part of a cutting part is intended to be received in the recess. The walls are externally conical and cooperate with a conical seat when the connecting piece is displaced axially in relation to a shank included in the tool. Upon the axial displacement, the male part is clamped in the recess. According to a preferred embodiment, the recess has members for jointly rotating the male part when rotating the tool.

OBJECTS AND FEATURES OF THE INVENTION

A primary object of the present invention is to provide a rotatable tool, in which the cutting head is exchangeable in an exceptionally user-friendly way.

Another object of the present invention is to improve the stability of the cutting head in relation to the shank.

At least the primary object of the present invention is realised by means of a rotatable tool which comprises a shank, a drawbar, and a cutting head. The shank is rotatable about a longitudinal axis. The drawbar is mounted to an axial front end of the shank, and the cutting head is mounted to an axial front end of the drawbar. The shank and the drawbar include mutually engageable displacement members for imparting an axial displacement of the drawbar relative to the shank. The cutting head and the drawbar include mutually engageable force transfer members for transferring forces therebetween in the axial direction. The force transfer members include serrations extending transversely relative to the axis.

The invention also pertains to a cutting head for rotation about a center axis of rotation, the cutting head including an axially forward cutting end and an axially rearward engagement portion comprising axially spaced serrations extending transversely relative to the axis.

Another aspect of the invention relates to a drawbar which defines a longitudinal axis of rotation and which includes an axial rear portion adapted to be anchored in a shank. An axially forward end of the drawbar includes an engagement portion adapted to receive a cutting head and including axially spaced serrations which extend transversely relative to the axis.

BRIEF DESCRIPTION OF THE DRAWINGS

Below, preferred embodiments of the invention will be described, reference being made to the appended drawings, where:

FIG. 1 shows a side view of a first embodiment of a tool according to the present invention;

FIG. 2 shows a perspective view of the tool according to FIG. 1;

FIG. 3 shows a perspective view of a cutting head included in the tool according to the present invention;

FIG. 4 shows a side view of the cutting head according to FIG. 3;

FIG. 5 shows a side view of the cutting head when this has been rotated 90° around a centre axis C-C in comparison with FIG. 4;

FIG. 6 shows a perspective view of a drawbar included in the tool according to the present invention;

FIG. 7 shows a side view of the drawbar according to FIG. 6;

FIG. 8 shows a side view of the drawbar when this has been rotated 90° around a centre axis C-C in comparison with FIG. 7;

FIG. 9 shows a side view of a shank included in the tool according to the present invention, certain hidden parts of the shank having been made visible;

FIG. 10 shows a section in the axial direction through the tool according to FIG. 1;

FIG. 10A shows an enlarged detail of FIG. 10;

FIG. 13 shows an exploded view in perspective of an alternative embodiment of a tool according to the present invention; and FIG. 14 shows an exploded side view of the alternative embodiment of the tool.

DESCRIPTION OF PREFERRED EMBODIMENTS

Figure 11:
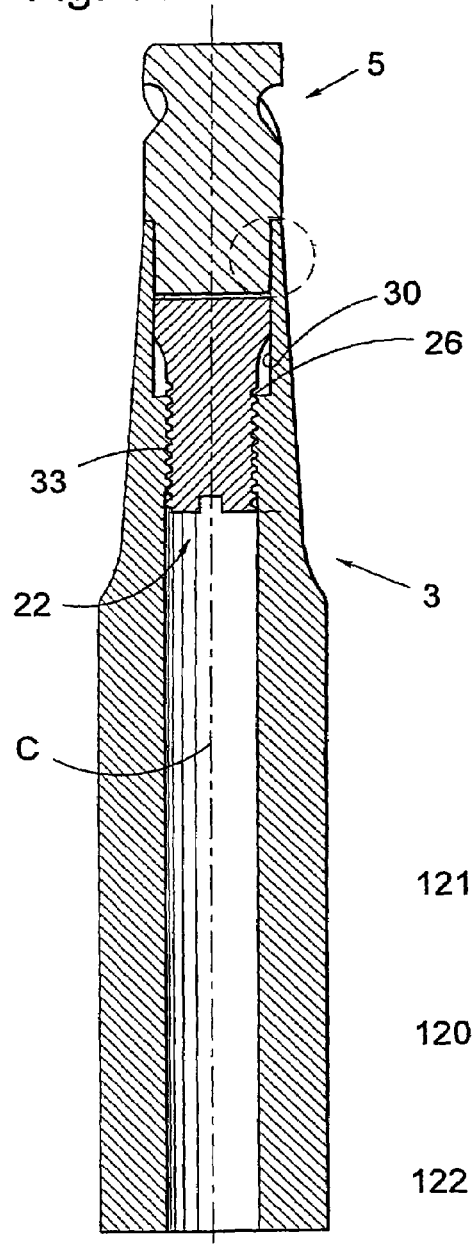
FIG. 11 shows a section in the axial direction through the tool according to FIG. 1, but the section is taken in a plane that is rotated by 90° in comparison with the section according to FIG. 10.

The embodiment shown in FIGS. 1 and 2 of a tool 1 according to the present invention consists of an end mill. The milling cutter according to FIGS. 1 and 2 comprises a shank 3 and a cutting head 5. The line C-C defines the axial center direction of the shank 3, of the cutting head 5 and of the entire milling cutter as well as the rotation axis of the milling cutter.

In FIGS. 3-5 the cutting head 5 is shown, which accordingly can be mounted exchangeably in the shank 3. The cutting head 5 has an axial center direction C-C, which coincides with the axial center direction C-C of the milling cutter when the cutting head 5 is mounted in the shank 3. For that purpose, the cutting head 5 has a male-shaped, first engagement portion 7, which is shaped basically as a truncated cone with two diametrically opposite material portions removed. Thereby, two generally parallel, planar, first side surfaces 9 are formed, which are provided with first linear serrations 10. In the embodiment illustrated in FIGS. 3-5, the first serrations consist of a plurality of uniform, straight and parallel ridges separated by grooves. The side surfaces 9 have an extension in the axial direction C-C of the cutting head 5 and are facing away from each other. As is seen in FIGS. 4 and 5, the longitudinal direction of the serrations 10 generally has an extension transverse to the axial direction C-C of the cutting head 5, more precisely perpendicular to the axial direction C-C of the cutting head 5.

However, the side surfaces 9 are not situated along the entire height of the first engagement portion 7. This entails that farthest away from the free end of the first engagement portion 7, there is formed a continuous first guide surface 8, of limited height, which accordingly extends around the entire circumference of the engagement portion 7. The first guide surface 8 has the same conicity as the rest of the engagement portion 7.

The cutting head 5 also comprises a chip-removing portion 11, and an intermediate portion 12 forming a transition portion between the first engagement portion 7 and the chip-removing portion 11. The intermediate portion 12 is provided with a key recess 13.

In the area of the connection of the first engagement portion 7 to the intermediate portion 12, there is formed a continuous, first support surface 14, running around the entire circumference of the cutting head 5, which surface generally has an extension perpendicular to the axial direction C-C of the cutting head 5. The first support surface 14 extends radially out from the first guide surface 8. This first support surface 14 is intended to come into abutment against the open end of the shank 3, adjacent to the seat of the shank 3, see below.

In FIGS. 6-8, a drawbar 20 is shown, which is included in the milling cutter according to the present invention. The drawbar 20 comprises a female-shaped, second engagement portion 21 and an externally threaded (male screw thread) anchoring portion 22. The axial center direction of the drawbar 20 is defined by the dash-dotted line C-C, see FIG. 7. The second engagement portion 21 comprises two generally parallel, planar, second side surfaces 23 and a bottom surface 24 connecting the side surfaces 23. The side surfaces 23 are facing each other and have an extension in the axial direction C-C of the drawbar 20. The two parallel side surfaces 23 are provided with second serrations 25, which have a longitudinal direction extending transverse to the axial direction C-C of the drawbar 20, more precisely perpendicular to the axial direction C-C. The second serrations also consist of a plurality of uniform, straight and parallel ridges being separated by grooves. Thus, the first serrations 10 of the cutting head 5 can mate with the second linear serrations 25 of the drawbar 20, by the ridges of one of said serrations engaging the grooves of the other of said serrations and vice versa for the transfer of forces in the axial direction C-C. Furthermore, the longitudinal direction of the serrations is to be understood as the longitudinal direction of the ridges and grooves making up the serrations.

The second engagement portion 21 has an external shape that constitutes a part of a circular cylinder. In the embodiment illustrated, the external thread 26 presented by the anchoring portion 22 has an extension along the entire length of the anchoring portion 22.

As is most clearly seen in FIG. 7, at the free end of the anchoring portion 22, the drawbar 20 is provided with a key recess 27, by means of which the drawbar 20 can be rotated by access from the end of the shank 3 that is facing away from a seat 30 of the shank 3, see FIG. 9.

Thus, the shank 3 shown in FIG. 9 is provided with a seat 30, which mainly has a circular cylindrical shape. However, in the area of the open end of the seat 30, a conical second guide surface 31 is formed, which has a limited extension in the axial center direction C-C of the shank. In the area of the open end of the seat 30, a second support surface 32 is also formed, which is situated in a plane transverse to the axial direction C-C and intended to co-operate with the first support surface 14 of the cutting head 5. The shank 3 also comprises an internal thread (female screw thread) 33, which is situated adjacent to the inner end of the seat 30.

In FIGS. 10, 10A, 11, 11A, it is seen how the different components included in the tool are mounted and co-operate with each other. Thus, the external thread 26 of the drawbar 20 has been brought into engagement with the internal thread 33 of the shank 3. While the female-shaped engagement portion 21 still is outside the free end of the shank 3, the cutting head 5 is mounted in the drawbar 20. That is effected by bringing the male-shaped engagement portion 7 of the cutting head 5 into cooperation with the female-shaped engagement portion 21 of the drawbar 20. In order to execute this, the male-shaped engagement portion 7 is inserted from the side into the female-shaped engagement portion 21. Thereby, each of the two parallel, first side surfaces 9 of the male-shaped engagement portion 7 will be oriented directly opposite an appurtenant second, side surface 23 of the drawbar 20, which surfaces 23 form a transversely open slot.

By rotating the cutting head 5 around the centre axis C-C, suitably by means of a key cooperating with the key recess 13, the drawbar 20 will also be rotated. At a certain direction of rotation, this means that the external thread 26 of the anchoring portion 22 is threaded into the internal thread 33 of the shank 3 to produce an axial displacement of the drawbar into the shank. The rotation of the cutting head 5 also means that the external limiting surfaces of the engagement portions 7 and 21 are received in the seat 30 of the shank 3. When this takes place, a stronger engagement between the male-shaped engagement portion 7 of the cutting head 5 and the female-shaped engagement portion 21 of the drawbar 20 will also arise.

When the external surface of the female-shaped engagement portion 21 contacts the seat 30 of the shank 3, a clamping of the male-shaped engagement portion 7 in the female-shaped engagement portion 21 will take place. By the presence of the first and second serrations 10 and 25, respectively, an exceptionally stable joint between the cutting head 5 and the drawbar 20 is provided. Upon continued rotation of the cutting head 5, the first guide surface 8 will come into co-operation with the second guide surface 31 of the seat 30 in the shank 3, see FIG. 11A, this abutment being effected in the area of the open end of the seat 3.

Figure 11A:
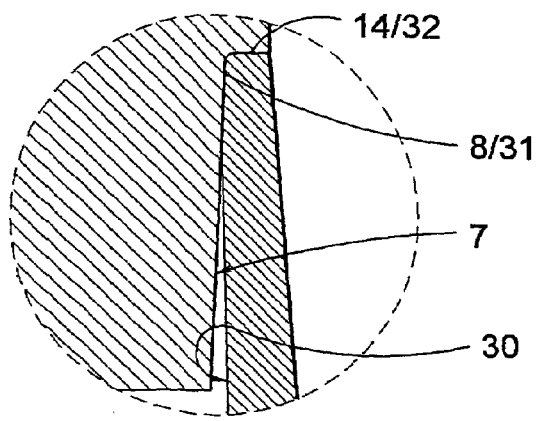
FIG. 11A shows an enlarged detail of FIG. 11.

As is particularly seen in FIG. 11A, there is a certain play between the main part of the male-shaped engagement portion 7 and the seat 30. Thereby, it is guaranteed that there will be a satisfactory guiding between the guide surfaces 8, 31 in the area of the open end of the seat 30.

When the cutting head 5 has assumed the final position thereof in the shank 3, also the first support surface 14 of the cutting head 5 has come into abutment against the second support surface 32 of the shank 3. The co-operation of the first guide surface 8 with the second guide surface 31 and the mutual co-operation of the support surfaces 14, 32 are important functions in order to make the clamping of the cutting head 5 in the shank 3 sufficiently stable. In that connection, it should be particularly pointed out that, according to a preferred embodiment, the diameter generated by the first guide surface 8 is somewhat larger than the diameter generated by the second guide surface 31. Since the guide surfaces 8, 31 are conical, the diameters are compared in sections that are perpendicular to the axial direction C-C and located at the same distance from the plane that contains the support surface 14 and 32, respectively. As for the stability, of course also the cooperating serrations 10 and 25 of the respective engagement portion 7, 21 contribute.

Figure 12:
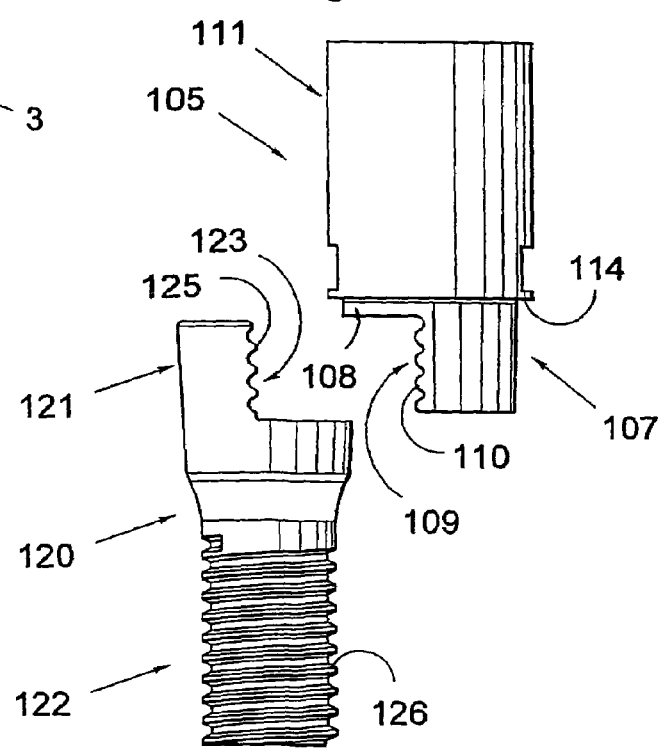
FIG. 12 shows a side view of a cutting head and a drawbar according to an alternative embodiment.

In FIGS. 12-14, an alternative embodiment of a tool 101 according to the present invention is shown. Correspondingly, as in the above-described tool, it comprises a shank 3, a cutting head 105 and a drawbar 120. As is indicated by the reference designation, the shank 3 may be identical with the shank shown above in FIG. 9. The cutting head 105 is provided with a first engagement portion 107, an intermediate portion 112 and a chip-removing portion 111. The first engagement portion 107 has a planar, first side surface 109, which is provided with first serrations 110, which generally have an extension in the longitudinal direction thereof transverse to the axial center direction C-C of the tool. The first engagement portion 107 has an external shape that constitutes a part of a truncated cone. Adjacent to the intermediate portion 112, the cutting head 105 is provided with a guide surface 108 as well as a first support surface 114, see FIG. 12. Both the guide surface 108 and the first support surface 114 extend around the entire circumference of the cutting head. The first support surface 114 extends radially out from the guide surface 108. The guide surface has a conicity that coincides with the conicity of the external surface of the first engagement portion 107.

The intermediate portion 112 is provided with a key recess 113. The chip-removing portion ill is only schematically shown in FIGS. 11-13.

The drawbar 120 comprises a second engagement portion 121 and an externally threaded anchoring portion 122. The axial center direction of the drawbar 120 is defined by the dash-dotted line C-C, see FIG. 12. The second engagement portion 121 comprises a planar, second side surface 123, which is provided with second serrations 125, which have a longitudinal direction that extends transverse to the axial center direction C-C of the drawbar 120, more precisely perpendicular to the axial center direction C-C. The second engagement portion 121 has an external shape that constitutes a part of a truncated cone. Correspondingly, as in the above-described embodiment, the anchoring portion 122 has an external thread 126.

When mounting the cutting head 105 in the shank 3, the two engagement portions 107 and 121 are brought into engagement with each other, this being effected when the draw-bar 120 is only partly inserted in the shank 3, see FIGS. 12 and 13. When the two engagement portions 107 and 121 are in engagement with each other, the serrations 110 and 125 of the respective engagement portion are in contact with each other. Upon simultaneous rotation of the two engagement portions 107, 121 in a certain direction, the engagement portions 107 and 121 of both the drawbar 120 and the cutting head 105 will be displaced down into the seat 30 of the shank 3. When the cutting head 105 is in principle entirely inserted in the seat 30, the guide surface 108 will come into co-operation with the seat 30 and the first support surface 114 will come into abutment against the second support surface 31 of the shank 3.

Generally, it applies for the milling cutter according to the present invention that the side surfaces 9, 23; 109, 123 should be provided with at least two serrations.

Feasible Modifications of the Invention

According to the present invention, the serrations arranged on a side surface of the engagement members do not need to be identical as regards the dimensions thereof. They may also have varying mutual distance, whereby erroneous mounting of the cutting head on the drawbar is prevented.

As has been pointed out above, the serrations 10 and 25 of the side surfaces 9 and 23, respectively, have a longitudinal direction that extends transverse to the axial direction C-C. By this expression, it is to be appreciated that the longitudinal direction of the serrations 10, 25 does not need to be perpendicular to the axial direction C-C but may be angled a few degrees.

Although the present invention has been described in connection with preferred embodiments thereof, it will be appreciated by those skilled in the art that additions, deletions, modifications, and substitutions not specifically described may be made without departing from the spirit and scope of the invention as defined in the appended claims.

What is claimed is:

1. Rotatable tool comprising a shank rotatable about a longitudinal axis, a drawbar mounted to an axial front end of the shank, and a cutting head mounted to an axial front end of the drawbar, wherein the shank and the drawbar include mutually engageable displacement members for imparting an axial displacement of the drawbar relative to the shank, and the cutting head and the drawbar include mutually engageable force transfer members for transferring forces therebetween in the axial direction, the force transfer members in each of the cutting head and the drawbar including a plurality of non-threaded serrations extending transversely relative to the axis.

2. The rotatable tool according to claim 1 wherein the force-transfer members comprise at least two mutually facing serrated surfaces on the cutting head and the drawbar, respectively.

3. The rotatable tool according to claim 2 wherein the two surfaces are arranged generally parallel to one another.

4. The rotatable tool according to claim 1 wherein the cutting head includes a conical guide surface disposed axially between an axial front end of the cutting head and the serrations, the guide surface extending circumferentially for substantially 360°.

5. The rotatable tool according to claim 4 wherein the cutting head further comprises a support surface extending transversely from an axially forward end of the guide surface, and extending circumferentially for substantially 360°.

6. The cutting head according to claim 1 wherein the displacement members respectively comprise a male screw thread on the drawbar and a female screw thread on the shank.

7. The cutting head according to claim 1 wherein the serrations are linear.

8. The rotatable tool according to claim 1 wherein the axially forward end of the drawbar includes a slot open in axial and transverse directions with mutually facing surfaces of the slots containing the serrations.

9. Cutting head for rotation about a center axis of rotation and including an axially forward cutting end, an axially rearward engagement portion comprising axially spaced non-threaded serrations extending transversely relative to the axis, and a conical guide surface disposed axially between the cutting end and the serrations, the guide surface extending circumferentially for substantially 360°.

10. Cutting head for rotation about a center axis of rotation and including an axially forward cutting end, an axially rearward engagement portion comprising axially spaced serrations extending transversely relative to the axis, a conical guide surface disposed axially between the cutting end and the serrations, the guide surface extending circumferentially for substantially 360°, and a support surface extending transversely from an axially forward end of the guide surface and extending circumferentially by substantially 360°.

11. The cutting head according to claim 9 wherein the serrations are linear.

12. The cutting head according to claim 9 further including a support surface extending transversely from an axially forward end of the guide surface and extending circumferentially by substantially 360°.

13. The rotatable tool according to claim 1 wherein the plurality of non-threaded serrations include ridges separated by grooves.

14. The rotatable tool according to claim 1 wherein the non-threaded serrations on the cutter are recessed into the drawbar.

15. The rotatable tool according to claim 1 wherein the force transfer members on the drawbar include two generally parallel, planar, second side surfaces and a bottom surface connecting the side surfaces.

16. Rotatable tool comprising:

a shank rotatable about a longitudinal axis;

a drawbar mounted to an axial front end of the shank; and a cutting head mounted to an axial front end of the drawbar, wherein the shank and the drawbar include mutually engageable displacement members for imparting an axial displacement of the drawbar relative to the shank, and wherein the cutting head and the drawbar include mutually engageable force transfer members for transferring forces therebetween in the axial direction, the force transfer members including serrations extending transversely relative to the axis, and wherein the cutting head includes an axially forward cutting end, an axially rearward engagement portion in which the force transfer members are located, a conical guide surface disposed axially between the cutting end and the serrations of the force transfer members, the guide surface extending circumferentially for substantially 360°, and a support surface extending transversely from an axially forward end of the guide surface and extending circumferentially by substantially 360°.

* * * * *